United States Patent [19]

Ilzig et al.

[11] 4,139,883

[45] Feb. 13, 1979

[54] ROTARY JOINT, PARTICULARLY TO SUSPEND HEAVY METAL WEIGHTS FROM A CEILING, SUCH AS AN OPERATING ROOM LIGHT

[75] Inventors: Karl F. Ilzig, Hanau am Main; Hans Scheidemann, Maintal, both of Fed. Rep. of Germany

[73] Assignee: Original Hanau Quarzlampen GmbH, Hanau am Main, Fed. Rep. of Germany

[21] Appl. No.: 804,771

[22] Filed: Jun. 8, 1977

[30] Foreign Application Priority Data

Jun. 18, 1976 [DE] Fed. Rep. of Germany ....... 2627514

[51] Int. Cl.² .............................. F21S 1/04; F21S 3/02; A61B 1/06
[52] U.S. Cl. .................................... 362/404; 248/278; 248/325; 362/427; 362/804
[58] Field of Search ................. 362/404, 427, 457, 33, 362/804; 248/278, 280, 281, 324, 325

[56] References Cited

U.S. PATENT DOCUMENTS

| 1,963,278 | 6/1934 | Pieper | 362/804 |
|---|---|---|---|
| 2,076,446 | 4/1937 | Carwardine | 362/427 |
| 2,547,532 | 4/1951 | Mendelsohn | 362/427 |
| 2,608,367 | 8/1952 | Boltuch | 362/427 |
| 2,919,098 | 12/1959 | Mull | 362/804 |
| 3,240,925 | 3/1966 | Paschke | 362/404 |
| 3,584,793 | 6/1971 | Ilzig | 362/404 |
| 3,820,752 | 6/1974 | Oram | 362/427 |

*Primary Examiner*—Samuel W. Engle
*Assistant Examiner*—Donald P. Walsh
*Attorney, Agent, or Firm*—Flynn & Frishauf

[57] ABSTRACT

A pivot support element is fixed in position to extend essentially vertically, and carries a horizontally projecting pivot pin. The movable pivotable member on which the weight is suspended is pivoted and connected to the pin by means of a plate-like pivot rod secured laterally to the pivotable member, so that the pivot pin will form the pivot axis for the plate-like element. The pivot pin additionally has fixedly attached thereto a link element, such as a short plate-like member to which a balance rod is pivotally attached which is connected with an intervening spring, typically a compression spring, to the weight-supporting member. Two plate-like pivot rods may be used, one on either side of the support member to provide for balanced attachment. The entire assembly is readily encapsulated in shell-like housing halves, to be essentially dust and contamination-proof, with minimum handling in assembly, or for cleaning and maintenance.

10 Claims, 3 Drawing Figures

U.S. Patent  Feb. 13, 1979  4,139,883
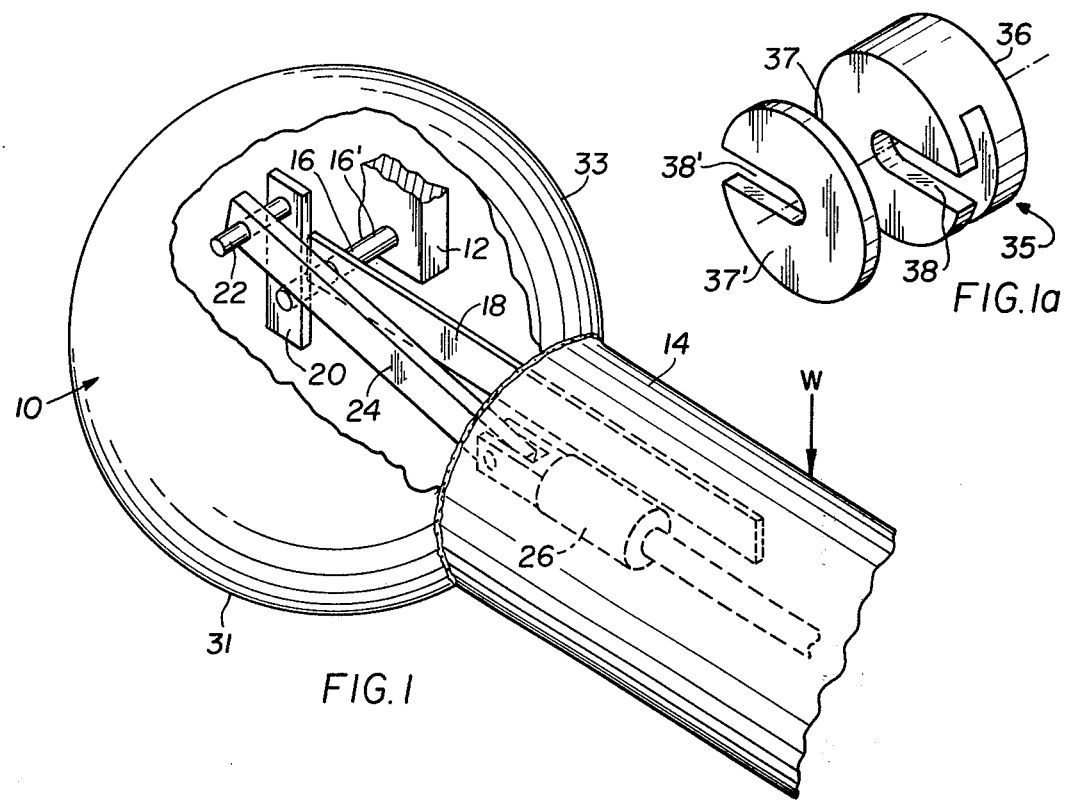
FIG.1
FIG.1a
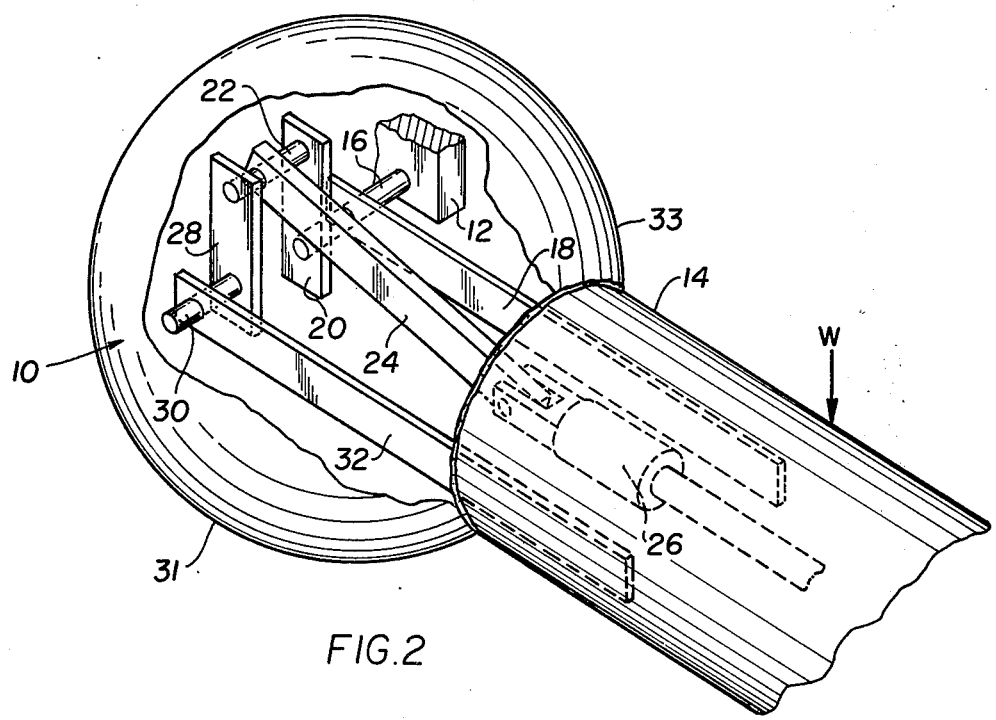
FIG.2

ROTARY JOINT, PARTICULARLY TO SUSPEND HEAVY METAL WEIGHTS FROM A CEILING, SUCH AS AN OPERATING ROOM LIGHT

Reference:

U.S. Pat. No. 3,584,793, June 15, 1971
U.S. Pat. No. 3,240,925, Mar. 15, 1966
the contents of which are incorporated by reference.

The present invention relates to a suspension joint, and more particularly to a suspension joint having a horizontal pivot axis to support a heavy weight at the end of a pivotable support element. To support the heavy weight, a counter balance spring is provided. A typical use for the suspension joint is to support an operating from light in position in such a way that it will be counter-balanced and, once placed in a predetermined position, will not move therefrom.

BACKGROUND AND PRIOR ART

A suspension joint of the type to which the present invention relates is described in U.S. Pat. No. 3,584,793. It is particularly adapted for medical apparatus since it is constructed to permit encapsulation in such a manner that closing shells or cups form only a single matching rotary joint. The mechanism itself s completely enclosed, to permit easy cleaning and prevent accretion of dust or contamination which is not permissible in medical surroundings. The structure as described has joint portions which form closed surfaces, such as circular surfaces which provide only a single rotary gap or crack between each other, all lying in one plane, to completely seal off the joint and the therein enclosed pins and other mechanisms to adjust counter balances and weights. The adjustment elements are accessible by severing the cover shells or cups.

The pivoting angle which can be obtained in such a structure can be about 360°, or as far as electrical supply conductors which pass through the joint permit. The joint elements must be manufactured as closed, comparatively complex structures, however, in order to permit an arrangement in which the exposed rotary gap or crack forms only a single circular joint and to provide, internally, the necessary attachment or bearing points for the spring-loaded balance rod, to balance the weight of an operating room light, or another heavy structure, attached to the pivot arm of the joint. The complex construction of the heads of the joint is costly and the assembly is complex.

It is an object of the present invention to provide a rotary joint to suspend a heavy weight, for example an operating room light, which is spring-loaded, which is simple to make, easy to install, and which has the advantages of the prior structure of being easily cleaned and of preventing accretion of dust, dirt or contamination thereon.

Subject matter of the present invention: Briefly, the pivot arm to which the weight is attached has secured thereto, preferably laterally, one or more pivot rods which, preferably, are in the form of elongated link rods. The pivot or link rods are pivotally connected to a support pin which, in turn, is fixedy secured to a bracket or support member extending essentially vertically, for example by being suspended from a ceiling structure. The pin, likewise, can carry a fixed link to eccentrically secure a balance rod which is spring-connected to the support member for the weight.

The rotary joint is simple to make and to assemble, and permits inexpensive manufacture. Theoretically, a pivoting range in excess of 360° is possible if the electrical connections are removed. The joint can be readily closed off by an inexpensive and simple cover made of plastic. The cover can be in the form of semi-spherical shells, or a shell and a disk, or the like, thus resulting in only a narrow and easily maintained rotary junction. The plastic cover forms a clean neat closure for the joint. After removal of the cover, that is, either or both of the shells or disks which may be of any suitable material besides plastic, the interior components of the rotary joints are freely accessible. The cover can be assembled to the holding pin or pivot pin by means of a slit which, after assembly, is closed; the cover may also be made in shell or cup shape, with two identical parts which are fitted together.

The entire structure is readily stabilized if two link plates are used, located at diametrically opposite sides of the pivoting member which, usually, is a hollow cylinder. The link plates are povited coaxially about coaxial pins which can be joined together by similar fixed links secured, respectively, to the respective pivot pins.

Drawings, illustrating an example:

FIG. 1 is a perspective view of a first embodiment of the rotary joint, in which the closure caps are shown in fragmentary form;

FIG. 1a is an exploded perspective view of a cap structure, shown reversed with respect to the direction of view of FIG. 1;

and FIG. 2 is a perspective view of another embodiment, in which a closure cap and a closure disk are shown in fragmentary representation.

The rotary joint 10 (FIG. 1) is used to form a pivotal connection of a first pivot or support member 12 with a second pivot or support member or arm 14. In the example selected, the arms 12, 14 form parts of the suspension system of an operating room light. The operating room fixture, which is heavy since it is arranged to provide uniform illumination over a wide area, is not shown in the drawings; it may be of any suitable and well-known construction. It is connected to the second arm 14. The electrical connections to the light-emitting portions likewise have been omitted from the drawing for simplicity.

Arm 14 can be moved to pivot about a horizontal axis 16' forming the central axis of a bearing pin 16. It is clamped to the first support arm of support member 12, fixedly secured thereto, for example by a press fit, by welding, or other secure connection. The second arm 14 is connected to a link plate 18, preferably secured to the outer surface of arm 14. Arm 14, as shown, is preferably a hollow cylinder through which the electrical conductors for the operating room light are guided. The link plate 18 extends beyond the edge of the arm 14 facing the pivot joint. The link plate 18 is pivotally secured to the pin 16. The link plate 18 may, for example, be formed of a single steel or other strong metal plate. The free end of the bearing pin 16 is rigidly secured to a fixed connecting plate 20. Connecting plate 20 has rigidly secured thereto a projecting stub pin 22, eccentrically positioned with respect to the axis 16' and parallel thereto, defining an auxiliary pivot axis. A balance rod 24 is pivoted to the stub pin 22. Balance rod 24 is connected to a loading spring 26, only shown schematically, and in turn, is connected to the second arm 14 in a known manner. Spring 26 may, for example, be a helical tension-compression spring. The balance rod 24 can freely pass by the pin 16 upon relative movement of the arm 14 with respect to the arm 12 and can pivot freely about its stub pin 22.

The drawing clearly shows the simplicity of the construction. The association of simple mechanical elements which can be manufactured inexpensively permits ready assembly and installation.

The pivot structure, as shown, is covered by a protective housing, preferably made of plastic material. The housing, as shown in FIG. 1, is formed of two cup or shell-like elements 31, 33 which preferably are identical and fit against each other, leaving merely a single thin rotary gap, which can overlap or can be formed with an interengaging ridge and groove, coaxial with the axis 16' of pin 16. The covering cap can also be formed as a unitary hollow structure 35 (FIG 1a) having an essentially cylindrical portion 36 and a disk-like end portion 37 formed with a gap or slit 38. The hollow structure 35 surrounds the joint similar to the half-shells 31, 33. The gap or slit 38, which has a T-shaped configuration separating part of the disk-like portion 37 from the hemispherical portion 36 of the body 35, is slipped over the pin 16 so that pin 16 will fit into and project through gap 38. After assembly, gap in the body 35 is covered with a disk 37 of similar configuration in which the gap or slit 38' is offset, or else the gap or slit 38 can be otherwise closed and sealed. It is not necessary that the arm 12 is vertical and for that reason it is shown broken off at the top and left in the drawing. Furthermore, the arm 12 can be swung relative to the arm 14 and vice-versa, in each case about the axis 16'.

The balance of the suspension can be improved by providing two link plates 18, 32, as shown in FIG. 2. The side of arm 14 diametrically opposed to the attachment of plate 18 has a second link plate 32 attached thereto which is pivoted about pin 30, secured to a second arm 28 which is rigidly attached to the eccentric stub pin 28. The angle of deflection or pivot of arm 14 can also be more than 360°, since the balance rod 24 can pass freely between the connecting plates 20, 28.

The weight of an operating lamp is schematically represented by the arrow W (FIGS. 1, 2). Since the spring force derived from spring 26 will change with the angle of positioning of the arm 14 with respect to the attachment of arm 12, for example on the ceiling of an operating room, the effective length of the lever formed by the eccentric positioning of the balance rod 24 due to the connecting plates 20, 28 permits complete balance of the weight W. The spring 26 can be so dimensioned — with respect to the distance between the pivot pin 16, 30 and the stub pin 22 that the weight W is completely balanced under any position of the arm 14 with respect to the arm 12, thereby maintaining an operating room light, for example, connected to the end of arm 14 at any position in which it is placed, for example manually.

A second support arm similar to arm 12 may be attached to the pin 30 (FIG. 2), arm 12 with the second support arm then forming essentially a double or U-shaped suspension which can be mounted directly or suspended from the ceiling of an operating room. The joint is preferably covered by a plastic shell-like housing formed of the halves 31, 33 as shown and described in connection with FIG. 1.

Various changes and modifications may be made, and features described in connection with any one of the drawings may be used with any of the others, within the scope of the inventive concept.

We claim:
1. Rotary joint to connect a fixed member (12) to a movable member (14) for suspension of heavy weights on the movable member (14) while permitting rotation about a horizontal axis (16'), in which the movable member (14) is adapted to pivot in a vertical direction, having
  a horizontally extending pivot pin (16) defining said axis and securely attached to the fixed member (12);
  a balance rod (24);
  spring means (26) connecting one end of said balance rod (24) to the movable member (14);
  a pivot rod (18) secured to said movable member (14), extending toward said pivot pin and pivotably connected with said pivot pin to provide a pivotal connection between said pin (16) and hence said fixed member (12) and said movable member (14);
  a fixed connection element (20), non-rotatably secured to said pivot pin (16) and extending transversely to the pivot axis (16') of said pivot pin (16);
  and pivot connection means (22) eccentrically with respect to said pivot axis (16') - positioned on said connecting element (20) and having an auxiliary pivot axis parallel to said horizontal axis (16'), the other end of the balance rod (24) being pivotably connected to said pivot connection means (22) and hence eccentrically to said fixed element (20) to secure the balance rod (24) eccentrically with respect to said axis (16') while permitting pivoting of said balance rod (24) about an axis parallel to said axis (16').

2. Joint structure according to claim 1, wherein said pivot rod (18) comprises an elongated pivot plate.

3. Joint structure according to claim 2, wherein the movable member (14) is elongated and tubular;
  and the pivot plate (18) is secured laterally to a side of said pivot rod and located in a plane transverse to said axis.

4. Joint structure according to claim 1, wherein said movable member (14) is an elongated hollow structure;
  and wherein two pivot rods (18) are provided, located at diametrically opposite sides of said movable hollow pivot rod structure (14), a first one of said pivot rods being pivoted on said horizontally extending pivot pin (16);
  a second connecting element (28) secured to said pivot connecting element (22) spaced therefrom and extending essentially parallel thereto;
  and a second pivot pin (30) located on said second connecting element (28) and extending coaxially with respect to said first pivot pin (16) and leaving a gap with respect to said first pivot pin (16), the second pivot rod (32) being pivotally connected to said second pivot pin (30), the balance rod (24) being movable in the gap defined by the spacing between said first and second connecting elements (20, 28).

5. Joint structure according to claim 4, wherein said pivot rods (18, 32) are elongated plates.
  said connecting elements (20, 28) are plate-like elements;
  and the pivot connection means (22) between said balance rod (24) and said fixed connecting elements (20, 28) comprises a bearing pin rigidly connecting said fixed plate-like elements and spacing said plate-like elements to provide said gap.

6. Joint structure according to claim 1, further comprising a housing cap surrounding said piviot pin, said connecting means and the pivotal connection of said connecting means to the balance rod to provide an essentially dust-tight cover therefor.

7. Joint structure according to claim 6, wherein said cap is of plastic.

8. Joint structure according to claim 6, wherein said cap is a unitary element (35) having a surface (37) formed with a slit (38) to fit around said horizontally extending pivot pin (16) and means (37') closing said slit after assembly.

9. Joint structure according to claim 6, wherein the cap comprises a separable cap structure including a pair of essentially similar shell-like, cup-shaped elements (31, 33) fitting against each other.

10. Joint structure according to claim 5, further comprising a housing cap surrounding said pivot pin, said connecting means and the pivotal connection of said connecting means to the balance rod to provide an essentially dust-tight cover therefor.

* * * * *